(12) United States Patent
Denning et al.

(10) Patent No.: US 6,330,246 B1
(45) Date of Patent: Dec. 11, 2001

(54) METHOD AND SYSTEM FOR SWITCHING SCSI DEVICES UTILIZING AN ANALOG MULTIPLEXOR

(75) Inventors: Donald Eugene Denning; Robert George Emberty; Craig Anthony Klein, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,883

(22) Filed: Aug. 21, 1998

(51) Int. Cl.[7] ................................................. H04L 12/40
(52) U.S. Cl. ................................. 370/438; 370/537
(58) Field of Search ................................. 370/362, 364, 370/438, 439, 533, 535, 537; 710/101, 107, 126, 129

(56) References Cited

U.S. PATENT DOCUMENTS

| | | | |
|---|---|---|---|
| 5,289,589 | 2/1994 | Bingham et al. | 395/425 |
| 5,357,519 | * 10/1994 | Martin et al. | 371/15.1 |
| 5,422,305 | * 8/1995 | Martin et al. | 326/30 |
| 5,572,685 | 11/1996 | Fisher et al. | 395/287 |
| 5,615,345 | 3/1997 | Wanger | 395/309 |
| 5,619,722 | 4/1997 | Lovrenich | 395/822 |
| 5,682,485 | 10/1997 | Farmer et al. | 395/311 |
| 5,699,533 | 12/1997 | Sakai | 395/311 |

* cited by examiner

Primary Examiner—David R. Vincent
(74) Attorney, Agent, or Firm—Robert M. Sullivan; Bracewell & Patterson, L.L.P.

(57) ABSTRACT

An analog SCSI switch comprising initiator device ports, target device ports and a controller utilizing at least one analog multiplexor circuit is connected between a SCSI interface and multiple SCSI devices. The controller monitors the SCSI bus and controls all interfaces and ports. By monitoring the SCSI bus, the controller is constantly informed of the arbitration, selection and re-selection acts of the initiator device or target devices. An analog multiplexor circuit selectively connects the initiator device and target device directly, allowing direct communication between the initiator device and a particular target device for duration of the connection. Logic for the controller, contained in the switch onboard memory, utilizes a secondary logical unit number of a target device to map a target device port. Utilizing the analog multiplexor circuit, the switch connects the initiator device port to a selected, mapped target device port. Error recovery is accomplished between the target device and initiator device, thus eliminating the need for buffers. Addressability of the SCSI interface is expanded to cover the number of target device ports multiplied by the number of target devices.

8 Claims, 7 Drawing Sheets

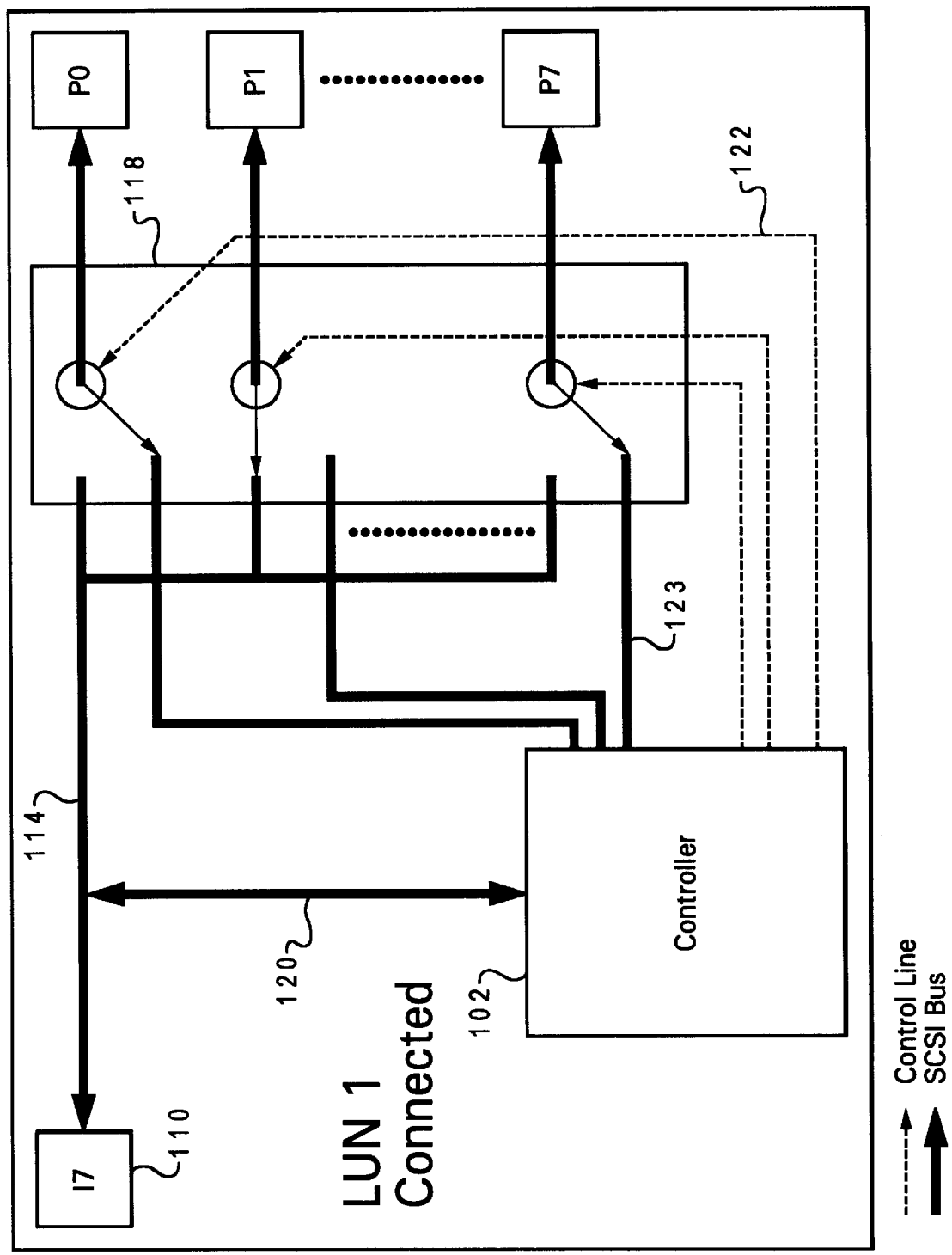

METHOD AND SYSTEM FOR SWITCHING SCSI DEVICES UTILIZING AN ANALOG MULTIPLEXOR

BACKGROUND OF THE INVENTION

1. Technical Field

The present invention relates in general to data processing systems and in particular to data processing systems utilizing a Small Computer System Interface ("SCSI") storage interface. Still more particularly, the present invention relates to increasing addressability of a SCSI interface.

2. Description of the Related Art

A Small Computer System Interface comprises a generic interface architecture with a standard signaling protocol. The SCSI interface operates as a low cost network for connecting such devices as hard disk drives, diskette drives, optical disk drives, CD ROM drives, tape drives, etc., to a host computer or network.

FIG. 3 depicts a high level logic flow diagram of the prior art communication ("I/O") process that takes place utilizing a SCSI interface. The I/O process occurs between two devices in the data processing system, an initiator device and a target device. The initiator device, usually the host computer, is responsible for initiating the I/O process to a target device through the SCSI controller and the SCSI bus. The target device, a peripheral such as a disk drive, is responsible for accomplishing the I/O process. Logical Units are additional peripheral devices that are addressable through the SCSI controller.

The process begins with step 300, which depicts the SCSI bus in a Bus Free (no bus activity) state. The process proceeds to step 302, which illustrates arbitration for the bus. If the winner of arbitration is an initiator device, the process then passes to step 304, which depicts selection of a target device by the initiator device. The process then passes to step 306, which illustrates an I/O process begun by the initiator device. The process continues to step 308, which depicts determination by the target device whether to disconnect and return to Bus Free state in step 300, or continue operation by proceeding to step 312 which illustrates the determination of whether there is data to be processed.

Returning to step 302; if a target device wins arbitration, the process instead proceeds to step 310, which depicts the re-selection of the initiator device by the target device to continue an I/O process that was previously begun. The process then passes to step 312, which illustrates the determination of whether there is data to be processed. If no data is to be processed, the process proceeds to step 318 which depicts presentation of ending status, by the target device, to the initiator device, indicating success or failure of the I/O operation. The process then terminates by passing to step 300, which illustrates return of the bus to a Bus Free state.

Returning to step 312; if there is data to be transferred, the process instead proceeds to step 314, which illustrates a transfer of data. The process continues to step 316, which depicts a determination, by the target device, of whether to terminate the I/O process or continue. If the I/O process is to be terminated, the process then returns to step 300, and the bus is returned to the Bus Free state. If the I/O process is not complete, the process proceeds instead to step 318, which illustrates the presentation of ending status, by the target device, to the initiator device, indicating success or failure of the I/O operation. The process then terminates by passing to step 300, which illustrates return of the bus to a Bus Free state.

As more and more data is moved from fault tolerant mainframe systems to lower cost networks, the need for redundant systems and data sharing capabilities on these smaller, low cost networks has increased. As SCSI interfaces, operating as low cost networks, become more central to the open systems computing environment, it becomes increasingly desirable to have a method to conveniently switch devices in and out of a configuration for data sharing, as well as for system availability reasons.

Manufacturing testing often has a need to switch SCSI devices in and out of a configuration. This is usually accomplished utilizing SCSI static switches, which are expensive, complex and failure prone. The static switch requires multiple driver/receiver assemblies and multiple relays to switch a device in and out of a configuration.

A typical approach to the SCSI switching problem is to utilize SCSI driver/receiver chips on the SCSI switch (initiator device) and the target devices, connected together via relays or digital multiplexors utilizing a SCSI bus. The signal path through the SCSI switch comprises two SCSI connectors, two driver/receivers, and a relay set to connect the driver/receivers and for logic that is necessary to operate the switching system.

Digital multiplexors require buffering, since an entire command must be accepted before it is re-transmitted to another port. If the control unit in the SCSI switch is digital, latency ensues because data and commands are buffered and delivered to the initiator device port in blocks. The initiator device port on the SCSI switch accepts the entire command and arbitrates with the target device port to send the command, via the SCSI bus, to the target device port.

Error recovery is complex in a buffered multiplexor. Once the command is accepted by an initiator device port, the SCSI switch must ensure that the command completes on the target device port and all error handling, reporting, fault isolation and data protection must be handled by the SCSI switch. In essence, the switch acts as an initiator device to the target devices and a target device to the initiator device. The SCSI switch must contain logic to handle both responsibilities in all possible perturbations. This is an extremely complex task which is costly to implement.

The required buffers, complicated logic, SCSI driver/receivers and processors required for use with a digital multiplexor combine to make the connection between the initiator device and the target device more error prone. The multiple connections alone provide error producing opportunities.

It would be desirable therefore, to provide a method and apparatus that would be relatively inexpensive, provide noise free transmission, require fewer components and have a less complicated configuration that would provide a less expensive and more reliable SCSI switching system.

SUMMARY OF THE INVENTION

It is therefore one object of the present invention to provide an apparatus that will increase the addressability of a SCSI interface.

It is another object of the present invention to provide an method that will replace a SCSI static switch to enable selective switching of SCSI devices in and out of a configuration for manufacturing testing.

It is yet another object of the present invention to reduce the cost of a SCSI switching device by reducing the number of components.

It is an additional object of the present invention to increase reliability of SCSI switching devices by reducing the number of components.

It is also an object of the present invention to provide switching while allowing SCSI devices to disconnect and reconnect during I/O processes.

It is a further object of the present invention to provide noise-free switching for a SCSI switch.

The foregoing objects are achieved as is now described. An analog SCSI switch comprising initiator device ports, target device ports and a controller utilizing at least one analog multiplexor circuit is connected between a SCSI interface and multiple SCSI devices. The controller monitors the SCSI bus and controls all interfaces and ports. By monitoring the SCSI bus, the controller is constantly informed of the arbitration, selection and re-selection acts of the initiator device or target devices. An analog multiplexor circuit selectively connects the initiator device and target device directly, allowing direct communication between the initiator device and a particular target device for duration of the connection. Logic for the controller, contained in the switch onboard memory, utilizes a secondary logical unit number of a target device to map a target device port. Utilizing the analog multiplexor circuit, the switch connects the initiator device port to a selected, mapped target device port. Error recovery is accomplished between the target device and initiator device, thus eliminating the need for buffers. Addressability of the SCSI interface is expanded to cover the number of target device ports multiplied by the number of target devices.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A–1C depict a high level block diagram of an analog SCSI switch and high level block diagrams of a controller within the analog SCSI switch shown in an idle state (FIG. 1B) and shown with Logical Unit Number 1 connected to an initiator device (FIG. 1C), in which a preferred embodiment of the present invention may be implemented;

DETAILED DESCRIPTION OF THE PREFERRED EMBODIMENT

Figure 1A:
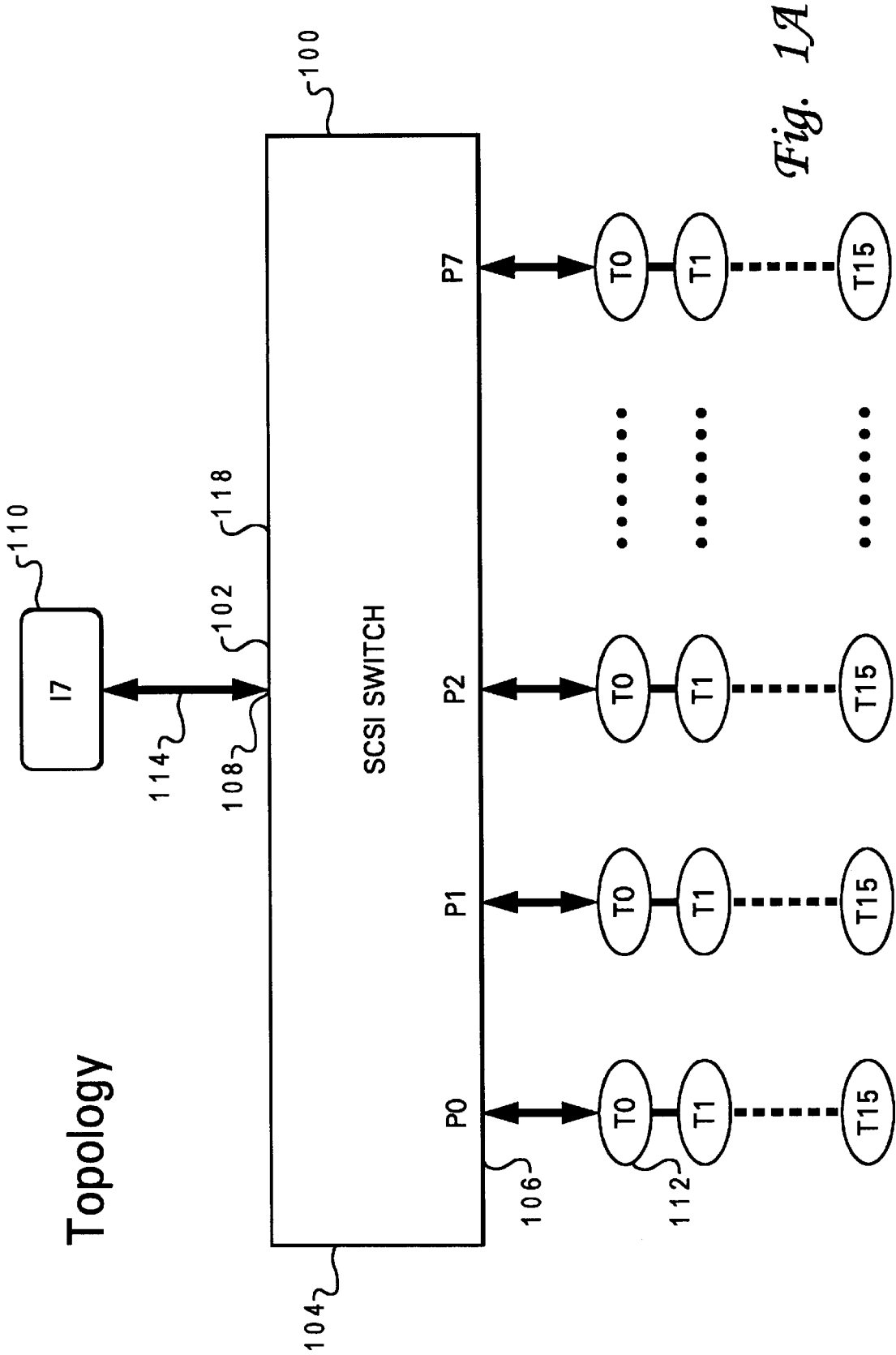
Figure 1B:
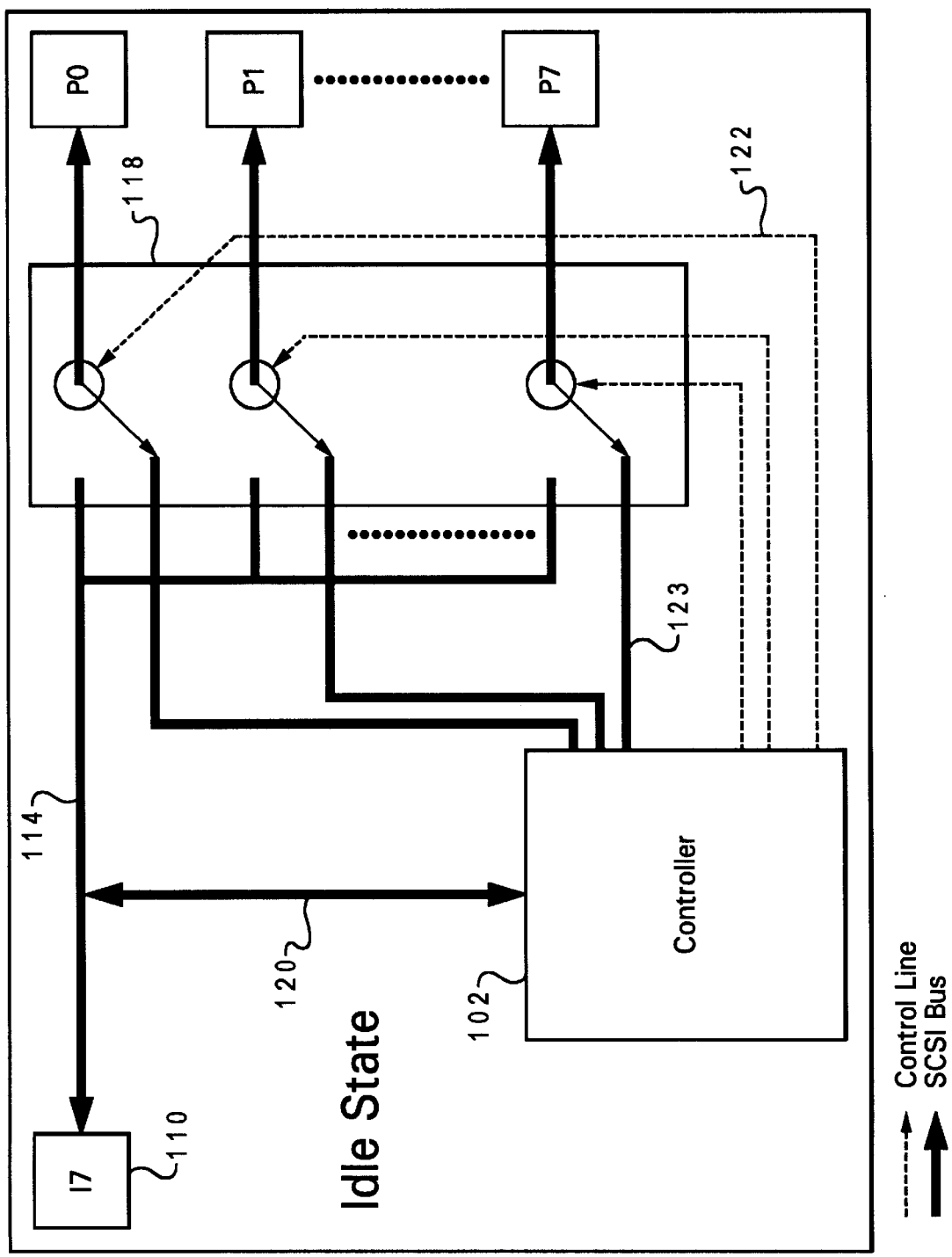

With reference now to the figures, and in particular with reference to FIGS. 1A–1C, a high level block diagram of an analog SCSI switch and high level block diagrams of a controller within the analog SCSI switch shown in an idle state (FIG. 1B) and shown with Logical Unit Number 1 connected to an initiator device (FIG. 1C), in which a preferred embodiment of the present invention may be implemented, is depicted. Analog SCSI switch 100 comprises controller 102, memory 104, at least one target device port 106 and at least one initiator device port 108. The communications system between initiator device 110 and target device 112 includes: initiator device 110, SCSI bus 114, analog SCSI switch 100, target device bus 116 and target device 112.

Controller 102 comprises at least one analog multiplexor circuit 118 for switching connections between initiator device 110 and target device 112. Controller 102 monitors SCSI bus 114 and follows the arbitration and selection process generated by initiator device 110. In this manner, controller 102 determines which port must be switched in. Depending on the address requested by initiator device 110, through initiator device port 108, controller 102 switches the communication path to the requested target device port 106.

Programmable controller 102 is programmable through onboard memory 104 contained within analog SCSI switch 100. Onboard memory 104 is a Field Programmable Gate Array ("FPGA") and contains logic which responds, through programmable controller 102, to the selection of initiator device 110 or re-selection of target device 112.

Analog multiplexor circuit 118 is a standard analog multiplexor circuit and is connected through SCSI bus 114 to initiator device 110. Analog multiplexor circuit 118 provides two way communication between the requested target device 112 and initiator device 110. In addition, all switching between initiator device 110 and any target device port 106 is accomplished by multiplexor 118 through SCSI bus 114 and target device bus 116.

FIG. 1B illustrates programmable controller 102 within analog SCSI switch 100 in an idle state. Initiator device 110 is connected to SCSI bus 114 and is being monitored by controller 102 through bus 120. Target device ports are represented by P0, P1, . . . P7. Controller 102 monitors all lines on SCSI bus 114 in this illustration and a bank of 27 lines may connect either controller 102 to target device port P0, P1, . . . P7, or initiator device 110 to target device port P0, P1, . . . P7. FIG. 1B and FIG. 1C show only three of nine target device ports and switching connections. Switching control lines 122 are represented by dotted lines connecting controller 102 and multiplexor 118.

FIG. 1C depicts controller 102 having switched initiator device 110 to port P1. In this depiction, 27 lines (including 9 data lines 123 and 9 control lines 122) are connected between initiator device 110 and port P1 with two way communication continuing between initiator device 110 and target device 106 through port P1. When initiator device 110 and port P1 are connected, the connection continues for the life of the communication.

Figure 2A:
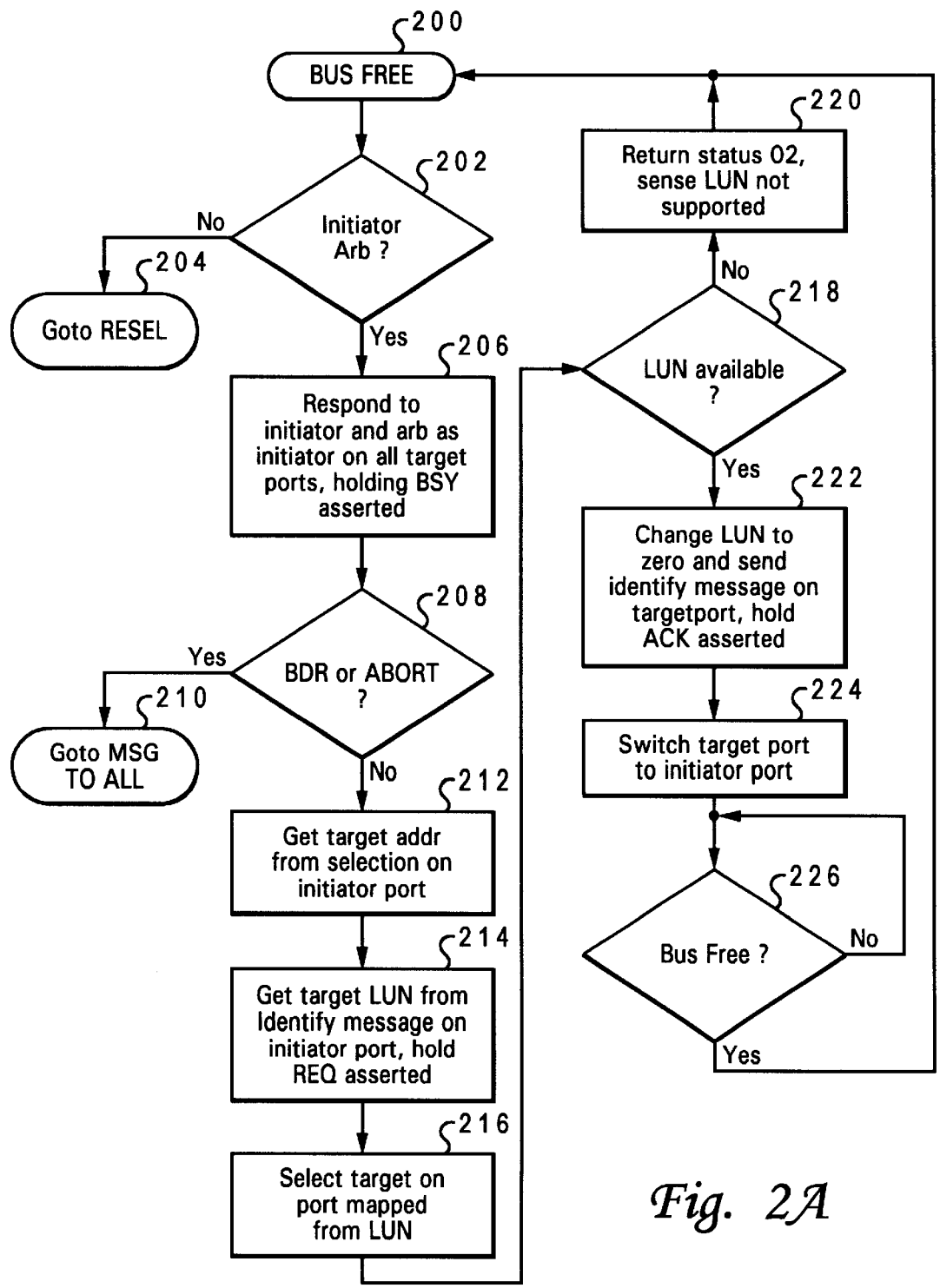
FIGS. 2A–2C illustrate a high level flow diagram of the method for switching between target devices, in accordance with a preferred embodiment of the present invention.
Figure 2B:
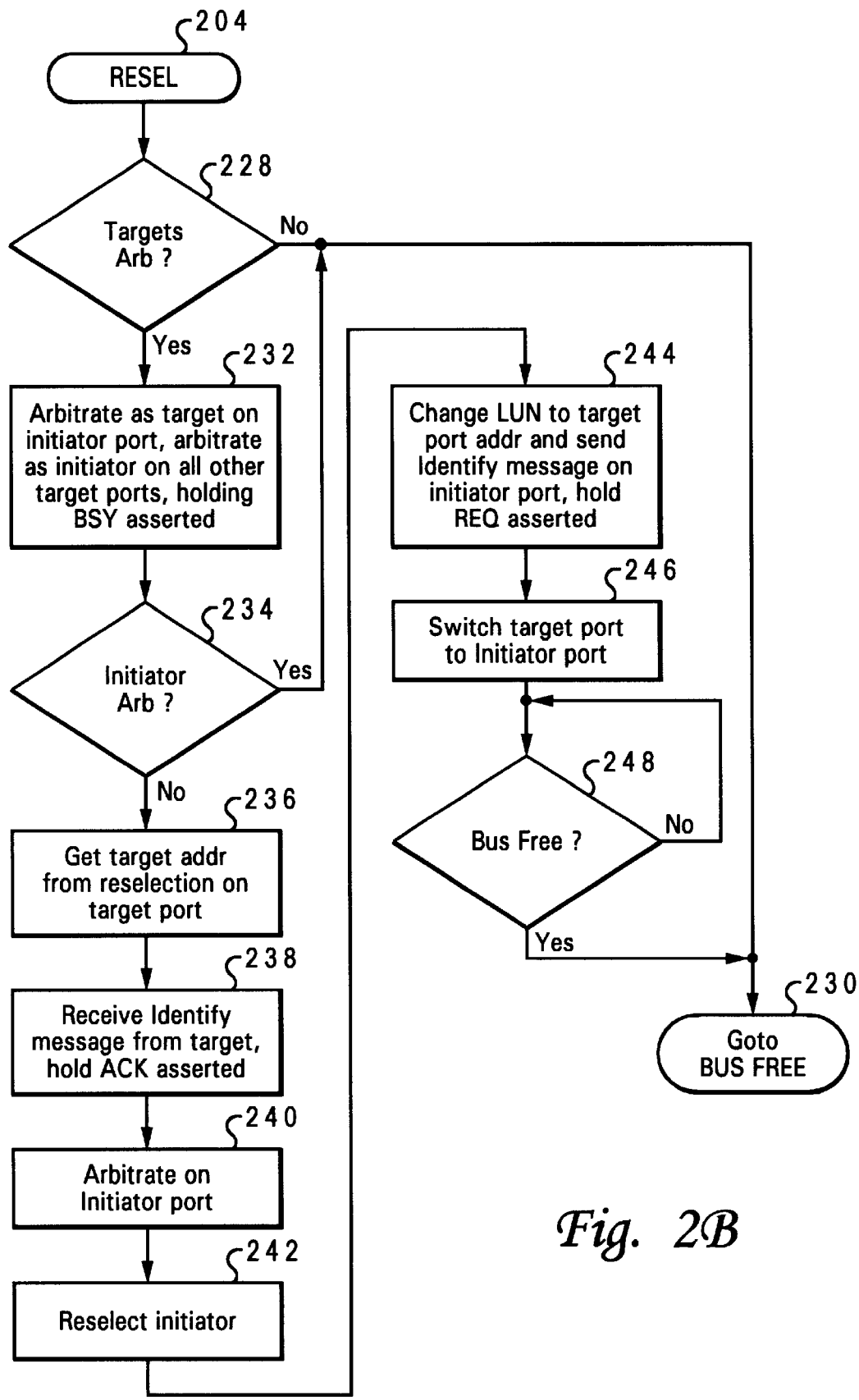
Figure 2C:
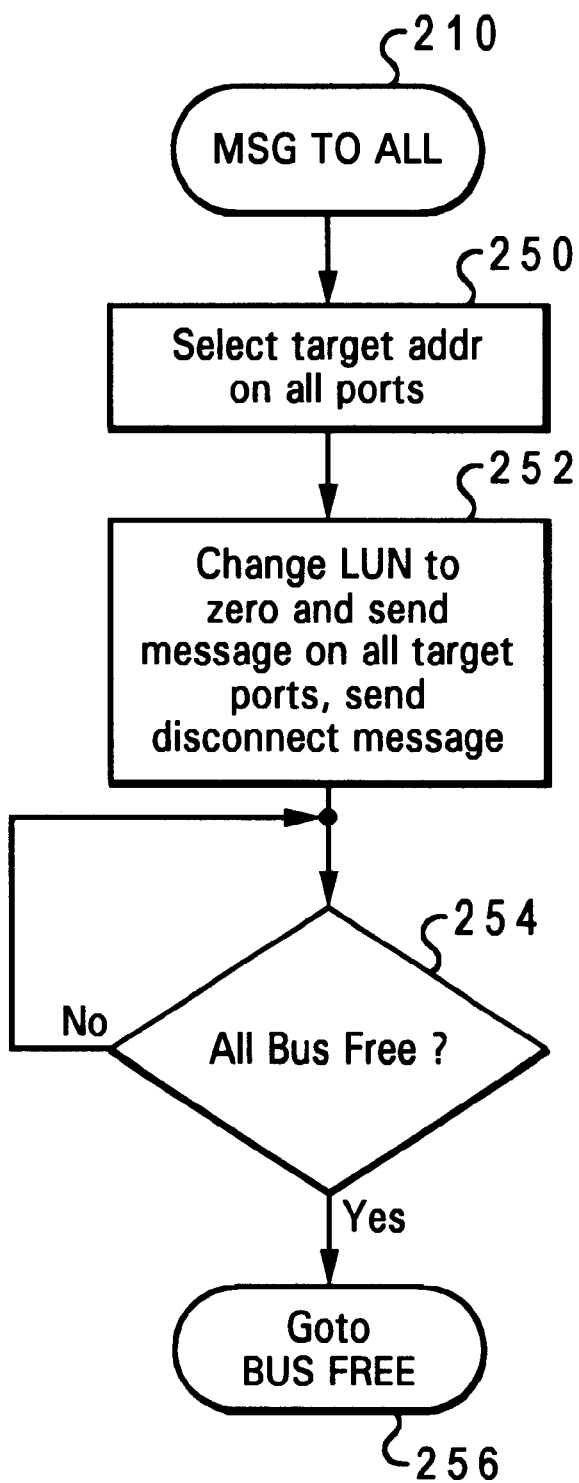
Figure 3:
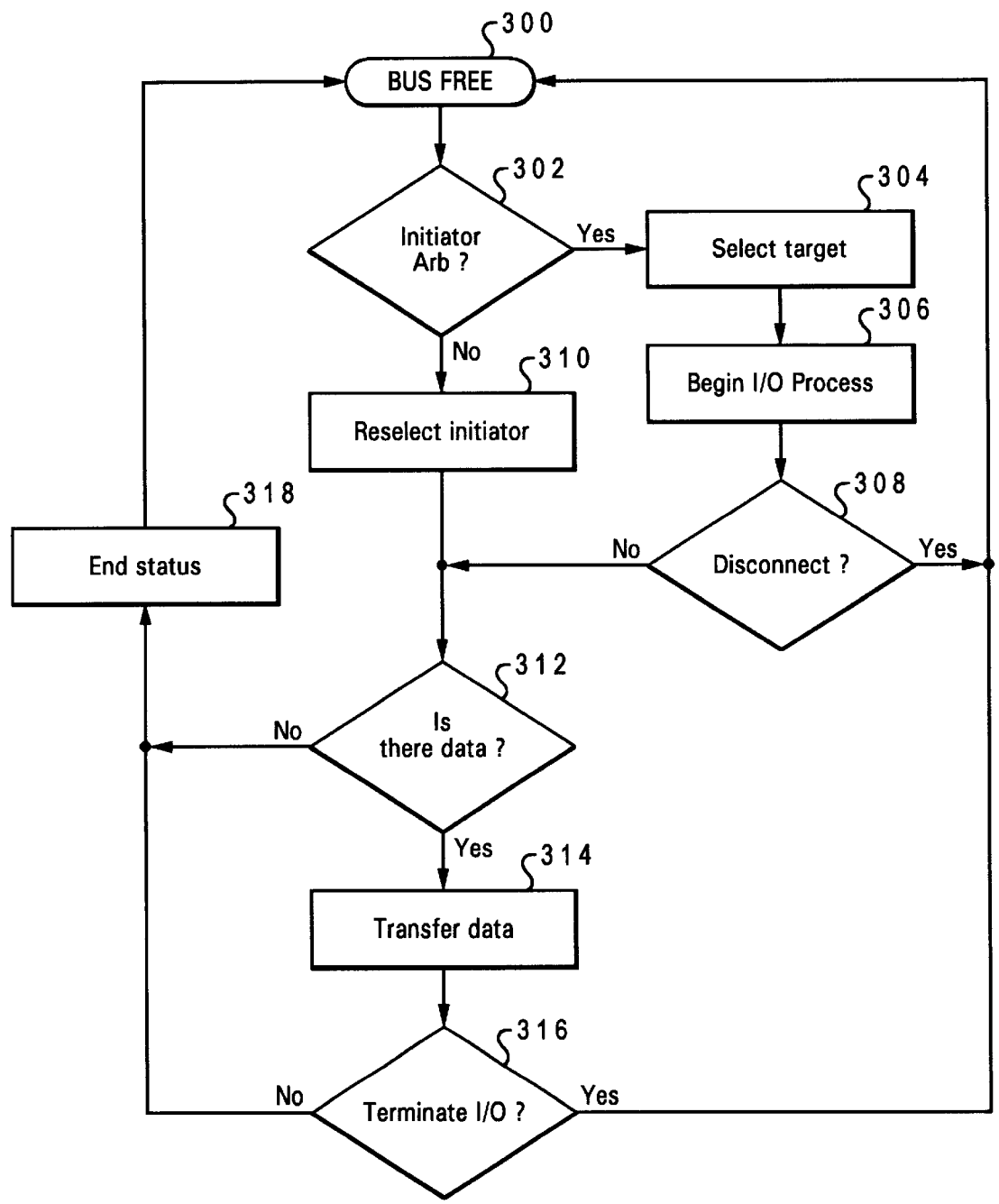
FIG. 3 depicts a high level logic flow diagram of the prior art communication ("I/O") process that takes place utilizing a SCSI interface.

Referring now to FIGS. 2A–2C, a high level flow diagram of a method for switching between target devices, in accordance with a preferred embodiment of the present invention, is illustrated. FIG. 2A illustrates the logic process programmed into memory 104 onboard analog SCSI switch 100 for switching between target devices that have been mapped to ports P1–P7 as shown in FIG. 1A.

The process begins with step 200, which depicts an indication by the analog SCSI switch that the SCSI bus is free. The process then proceeds to step 202, which illustrates a determination of whether the initiator device is arbitrating for the bus. If not, the process passes to step 204, which is illustrated and described in FIG. 2C. If the initiator device is arbitrating for the SCSI bus, the process then proceeds to step 202, which depicts a response by the analog SCSI switch to the initiator device and arbitration in place of the initiator device on all target device ports, while holding the SCSI signal BSY active to maintain control of all target device ports. The process continues to step 208, which illustrates completion of arbitration on all initiator device and target device ports. The SCSI switch then determines the desired target device address from the initiator device as it proceeds through selection at the initiator device port. The switch may then determine whether a specific Logical Unit Number ("LUN") is requested or if a message is to be sent to all LUNs for a particular target device address by going to message out phase and receipt of the first message from the initiator device. If the message is a Bus Device Reset or Abort message, the process passes to step 210, which depicts transmission of the by the SCSI switch of the message to all LUNs at a target device address. The SCSI switch waits for Bus Free on all target device ports, then returns to a Bus Free state on the initiator device port as illustrated in FIG. 2C.

If the communication is not being aborted, the process instead proceeds to step 212, which illustrates reception by the analog SCSI switch of a target device address on the initiator device port. Next, the process passes to step 214, which depicts acquisition of the Logical Unit Number (LUN) of the target device from the Identify message on the initiator device port, by the analog SCSI switch, and retention of REQ (indication from the target device requesting an information transfer handshake). The process next passes to step 216, which illustrates selection of the target device on the port that is mapped from the Logical Unit Number. The initiator device has transmitted the LUN to the analog SCSI switch and the analog SCSI switch will map that logical number to a specific port.

The process next proceeds to step 218, which depicts a determination, by the analog SCSI switch, of whether the LUN is available. If the LUN is not available, the process proceeds to step 220, which illustrates the return of the analog SCSI switch of a non-availability status to the initiator device. The process then returns to step 200, thus allowing the SCSI bus to return to a Bus Free state.

If the LUN is available, the process proceeds instead to step 222, which illustrates the address change of the LUN on the target device to zero by the analog SCSI switch, sending an identify message on the target device port and holding ACK signal (ACK signal indicates initiator's acknowledgment of an information transfer handshake). The process next proceeds to step 224, which depicts the connection by the analog SCSI switch of the port where the target device has been mapped to the initiator device port.

The process then proceeds to step 226, which illustrates determination, by the analog SCSI switch, of whether the SCSI bus is free. If the SCSI bus is busy, i.e., the initiator device and target device are still communicating, the process returns to step 226 and the analog SCSI switch continues to check the SCSI bus. If the SCSI bus is not busy, the process returns to step 200, where arbitration for the bus resumes.

FIG. 2B is a flow diagram of the re-selection I/O process performed by a target device. The process continues from FIG. 2A, where, from step 202, the analog SCSI switch has determined that the initiator device is not arbitrating for the SCSI bus and the process has passed to step 204, which depicts that the status of the SCSI bus may be in the RESELECT phase (target device is responsible for driving the data bus and controls direction of the data movement). The process next passes to step 228, which illustrates determination, by the analog SCSI switch, of whether the target device is arbitrating for the SCSI bus. If not, the process then proceeds to step 230, which depicts an absence of arbitration taking place on the bus and the process returns to step 200, which illustrates a Bus Free state.

If the target device is arbitrating for the SCSI bus, the process continues, instead, from step 228 to step 232, which illustrates arbitration by the analog SCSI switch, as the target device, on the initiator device port and all other target device ports and holding the BSY signal (indicates the bus is being utilized). The process then passes to step 234, which depicts determination by the analog SCSI switch, of whether the initiator device is arbitrating for the bus. If the initiator device is arbitrating for the bus, the process proceeds next to step 230, where the analog SCSI switch relinquishes control of the SCSI bus to the initiator device by going to the Bus Free state (step 200) on all target device ports, due to a higher priority of the initiator device's SCSI ID.

If the initiator device is not arbitrating for the bus, the process then proceeds to step 236, which illustrates acquisition of the target device address from the re-selection ID (specific target device identity) on the target device port by the analog SCSI switch. The process continues to step 238, which depicts reception of the ID from the target device and retention of the ACK (acknowledge) signal. The process next passes to step 240, which illustrates arbitration on the initiator device port. The process then proceeds to step 242, which depicts completion of re-selection of the initiator device. The process next passes to step 244, which illustrates the change of the Logical Unit Number of the target device to the target device port address and transmittal of the ID message on the initiator device port. In addition, the analog SCSI switch holds the REQ (request) signal.

The process then proceeds to step 246, which depicts the target device port connected to the initiator device port. The process next proceeds to step 248, which illustrates a determination of whether the bus is free. If the SCSI bus is not free, the process returns to step 248 until the SCSI bus is free. At the point that the SCSI bus is free, the process then proceeds to step 230, which depicts a signal transmittal by the analog SCSI switch that the bus is free.

FIG. 2C is continued from FIG. 2A, step 208, which depicts transmittal of the first message to the target. If the message is an abort or a bus device reset, the process proceeds to step 210, which depicts transmittal of the message to all ports. The step next passes to step 250, which illustrates a selection of the target device address on all ports. The process then proceeds to step 252, which depicts a change of the Logical Unit Number address on the target device to zero, a transmittal of change to all target device ports and delaying for receipt of a Bus Free signal.

The process then proceeds to step 254 which illustrates a determination of whether all busses are free. If not, the process returns to step 254 and repeats until the bus is free. If the analog SCSI switch signals the bus free, the process continues to step 256, which depicts transmittal of a signal by the analog SCSI switch that the bus is free.

It is important to note that while the present invention has been described in the context of a fully functional data processing system, those skilled in the art will appreciate that the logic of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A switching apparatus, in a data processing system having an interface, an initiator device, a plurality of target devices and a SCSI bus interconnecting said interface and said initiator device with said plurality of target devices, comprising:

a switch, interposed between said SCSI bus and said plurality of target devices, having an analog multiplexor circuit for connecting said initiator device to a selected one of said plurality of target devices; and controller means for selectively connecting and reconnecting said initiator device to said selected one of said plurality of target devices.

2. The switching apparatus in claim 1, wherein switch interposed between said SCSI bus and said plurality of target devices, having an analog multiplexor circuit for connecting said initiator device to a selected one of said plurality of target devices, further comprises:

an initiator device port;

a plurality of target device ports; and a programmable controller having
      a memory, said memory having logic for controlling said interface, monitoring a SCSI bus, and for connecting said initiator device port to a selected one of said plurality of target device ports utilizing said analog multiplexor circuit.

3. The switching apparatus in claim 2, further comprises a monitoring circuit for monitoring said SCSI bus which interconnects said initiator device with an initiator device port on said switch.

4. The switching apparatus in claim 1, wherein said interface is a SCSI interface.

5. The switch in claim 2, wherein said programmable controller having a memory, said memory having logic for controlling said interface, monitoring a SCSI bus, and for connecting said initiator device port to a selected one of said plurality of target device ports utilizing said analog multiplexor circuit, further comprises:

controller means for utilizing a secondary logical unit number as an address of said selected one of said plurality of target devices to map to said selected one of said plurality of target device ports;

modification means for changing a field in said secondary logical unit number to zero; and regulation means for continuing connection of said initiator device and said selected one of said plurality of target device ports for the life of the communication.

6. A method for switching SCSI devices, in a data processing system having an initiator device, an interface, a SCSI bus, a plurality of target devices, and a switch having at least one initiator device port, a plurality of target device ports, a programmable memory and an analog multiplexor circuit, comprising:

interposing said switch between said SCSI bus and said plurality of target devices;

interconnecting said switch, said initiator device and said plurality of target devices, wherein said initiator device is connected to said initiator device port and said plurality of target devices are connected to said plurality of target device ports;

switching between said initiator device port and said plurality of target device ports;

transmitting I/O communications between said initiator device and a selected one of said plurality of target devices;

allowing said selected one of said plurality of target devices to interrupt said connection from said initiator device;

re-establishing said connection between said one of said plurality of target devices to said initiator device; and continuing said I/O communication to completion.

7. The method in claim 6, wherein interposing said switch between said SCSI bus and said plurality of target devices, further comprises:

utilizing said switch for
      controlling said interface,
      monitoring said SCSI bus and
      connecting said initiator device port to a selected one of said plurality of target device ports utilizing said analog multiplexor circuit.

8. The method in claim 7, further comprising:

utilizing a secondary logical unit number of a selected target device address to map said selected target device address to said selected one of said plurality of target device ports;

changing a field in said secondary logical unit number to zero;

maintaining connection of said initiator device and said selected one of said plurality of target device ports; and continuing said I/O communication to completion of said I/O communication.

* * * * *